(12) United States Patent
Kajitani et al.

(10) Patent No.: US 11,358,207 B2
(45) Date of Patent: Jun. 14, 2022

(54) PRESS FORMING SYSTEM (71) Applicant: SUMITOMO HEAVY INDUSTRIES, LTD., Tokyo (JP)

(72) Inventors: Junpei Kajitani, Ehime (JP); Satoshi Kondo, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 342 days.

(21) Appl. No.: 16/211,380

(22) Filed: Dec. 6, 2018

(65) Prior Publication Data

US 2019/0176209 A1 Jun. 13, 2019

(30) Foreign Application Priority Data

Dec. 12, 2017 (JP) .............................. JP2017-237320

(51) Int. Cl.
*B21D 43/02* (2006.01)
*B21D 22/02* (2006.01)
*G05B 19/418* (2006.01)

(52) U.S. Cl.
CPC ............ *B21D 43/02* (2013.01); *B21D 22/02* (2013.01); *G05B 19/41865* (2013.01); *G05B 2219/31376* (2013.01); *G05B 2219/50386* (2013.01)

(58) Field of Classification Search
CPC ....... B21J 9/20; B21J 9/022; B21J 9/18; B21J 13/08; B21J 5/02; B21J 13/10; B21D 43/04; B21D 43/05; B21D 43/02; B21D 22/02; B21D 43/025; B21D 43/12; G05B 19/41865; G05B 2219/50386; G05B 2219/31376; G05B 2219/31261; G05B 2219/43128; G05B 19/41815; B30B 15/144; B30B 15/30
See application file for complete search history.

(56) References Cited

U.S. PATENT DOCUMENTS 3,557,686 A * 1/1971 Sapolsky ............... B21D 43/05
100/43
3,888,097 A * 6/1975 Fortman ............... B30B 15/144
72/30.1
(Continued)

FOREIGN PATENT DOCUMENTS

JP 60-037228 A * 2/1985 ............. B21D 43/02
JP H10-175030 A 6/1998
(Continued)

*Primary Examiner* — Edward T Tolan
(74) *Attorney, Agent, or Firm* — Michael Best & Friedrich LLP (57) ABSTRACT

A press forming system includes a press working unit, a material supply device, a detection device, and a control device. The press working unit includes a slide that moves in accordance with an operation pattern in which the slide passes through an advance position where press forming is formed from a withdrawal position, and returns to the withdrawal position. The material supply device starts a supply operation at a synchronous timing before the slide returns from the advance position to the withdrawal position. The control device performs a control for stopping the slide before the slide reaches the withdrawal position from the advance position in a case where the suppliable state of the forming material is not detected within a predetermined determination period by the detection device.

6 Claims, 7 Drawing Sheets

(56) References Cited

U.S. PATENT DOCUMENTS

| | | | | |
|---|---|---|---|---|
| 6,105,414 | A | * 8/2000 | Yamada | ............... B21K 27/04 72/405.16 |
| 6,272,892 | B1 | 8/2001 | Ozaki et al. | |
| 2011/0132208 | A1 | * 6/2011 | Asakawa | ............... B30B 15/26 100/35 |
| 2013/0074558 | A1 | * 3/2013 | Tado | ..................... B30B 1/266 72/29.2 |
| 2013/0074571 | A1 | * 3/2013 | Tado | ........................ B21J 9/20 72/373 |
| 2013/0074710 | A1 | * 3/2013 | Kuboe | .................. B30B 15/12 100/35 |

FOREIGN PATENT DOCUMENTS

| | | |
|---|---|---|
| JP | 2003-260530 A | 9/2003 |
| JP | 2003-275833 A | 9/2003 |
| JP | 3477103 B2 | 12/2003 |

* cited by examiner

PRESS FORMING SYSTEM

RELATED APPLICATIONS

Priority is claimed to Japanese Patent Application No. 2017-237320, filed Dec. 12, 2017, the entire content of which is incorporated herein by reference.

BACKGROUND

Technical Field

Certain embodiments of the present invention relate to a press forming system.

Description of Related Art

Related-art press forming systems include a forging press device, an inlet-side conveying device that feeds a forming material into the forging press device, a material detection unit that detects whether or not the inlet-side conveying device is capable of feeding the forming material, and an overall control device.

The control device advances a conveyance operation of the forming material in dies by the transfer feeder within the forging press device to execute a press operation if the material detection unit detects a feedable state of the forming material. Additionally, in a case where the material detection unit does not detect the feedable state of the forming material, a control for starting the transfer feeder is performed if the feedable state is detected within a given time with the transfer feeder within the forging press device being in a waiting state.

SUMMARY

According to an embodiment of the present invention, there is provided a press forming system including a press working unit that performs press forming on a forming material; a material supply device that supplies the forming material to the press working unit; a detection device that detects a suppliable state of the forming material to the material supply device; and a control device that controls the press working unit and the material supply device. The press working unit includes a slide that moves in accordance with an operation pattern in which the slide passes through an advance position where press forming is formed from a withdrawal position, and returns to the withdrawal position. The material supply device starts a supply operation at a synchronous timing before the slide returns from the advance position to the withdrawal position. The control device performs a control for stopping the slide before the slide reaches the withdrawal position from the advance position in a case where the suppliable state of the forming material is not detected within a predetermined determination period by the detection device.

DETAILED DESCRIPTION

In the above related-art press forming system, an operation control for making a transfer feeder temporarily wait for is performed. However, in the press forming system, it is necessary to synchronize the transfer feeder with the press operation. Thus, it is also necessary to stop a slide that performs pressing at the time of stop of the transfer feeder.

In that case, the slide stops a drive shaft for applying the power of the press operation at a top dead center position where the slide is withdrawn most upward.

Then, if the material detection unit detects the feedable state of the forming material, the drive shaft resumes the rotation thereof. However, even if the transfer feeder is started at that time, there is a concern that the conveyance operation is performed not in time and the transfer feeder interferes with the slide. Thus, in the forging press device, it is necessary to perform blank striking once, wait for the rotation of the drive shaft, and start the transfer feeder at an appropriate timing at the next rotation.

In this case, since the forging press device is operated in a blank striking state, productivity is reduced by that amount. Additionally, since forming in the same process is performed twice due to the blank striking, there is a problem that the quality planned at the beginning is no longer obtained. operation with a conveyance operation by a transfer feeder.

It is desirable to excellently synchronize a press operation with a conveyance operation by a transfer feeder.

According to the embodiment of the invention, in a case where the suppliable state of the forming material is not detected within the determination period by the detection device, the slide is stopped before the slide reaches the withdrawal position from the advance position. Thus, it is possible to suppress occurrence of blank striking in the press working unit and to rapidly resume the operation of the material supply device.

One Embodiment

Figure 1:
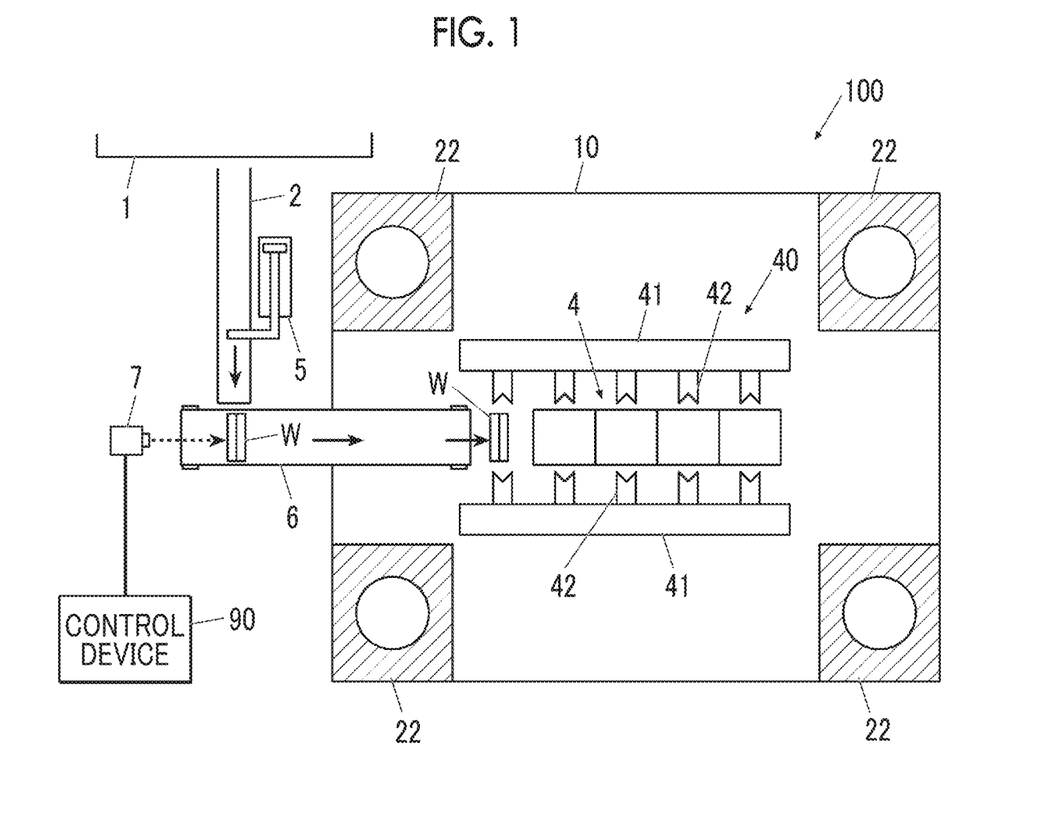
FIG. 1 is a configuration view illustrating a press forming system related to one embodiment of the invention.

A press forming system 100 of one embodiment of the invention will be described with reference to FIGS. 1 to 6. FIG. 1 is a configuration view illustrating the press forming system 100.

Schematic Configuration of Press Forming System

The press forming system 100 includes a heating furnace 1, a loading conveyor 2, a loading device 6, a detection device 7, a forging press device 10, and a control device 90.

The heating furnace 1 is composed of an induction heater or the like that heats a forming material W.

The loading conveyor 2 is a roller-type conveying device that conveys the forming material W heated in the heating furnace 1 to the loading device 6.

The loading conveyor 2 is provided with a pusher 5 so that the forming material W discharged from the heating furnace 1 can be fed into the loading device 6.

The loading device 6 is a motor-driven belt conveyor mechanism, and is capable of loading the forming material W to a reception position of a transfer feeder 40 of the forging press device 10 to be described below.

The detection device 7 detects the forming material W supplied from the loading conveyor 2 at an upstream predetermined position in a conveyance direction of the loading device 6. The detection device 7 is configured to detect, for example, a predetermined high-temperature object like a hot metal detector. However, it is also possible to substitute other detecting means capable of detecting the presence or absence of an object at a predetermined position, for example, a proximity sensor, a camera, or the like irrespective of temperature.

The suppliable state of the forming material W to a press working unit by the transfer feeder 40 can be detected by the detection of the forming material W by the detection device 7.

Forging Press Device

Figure 2:
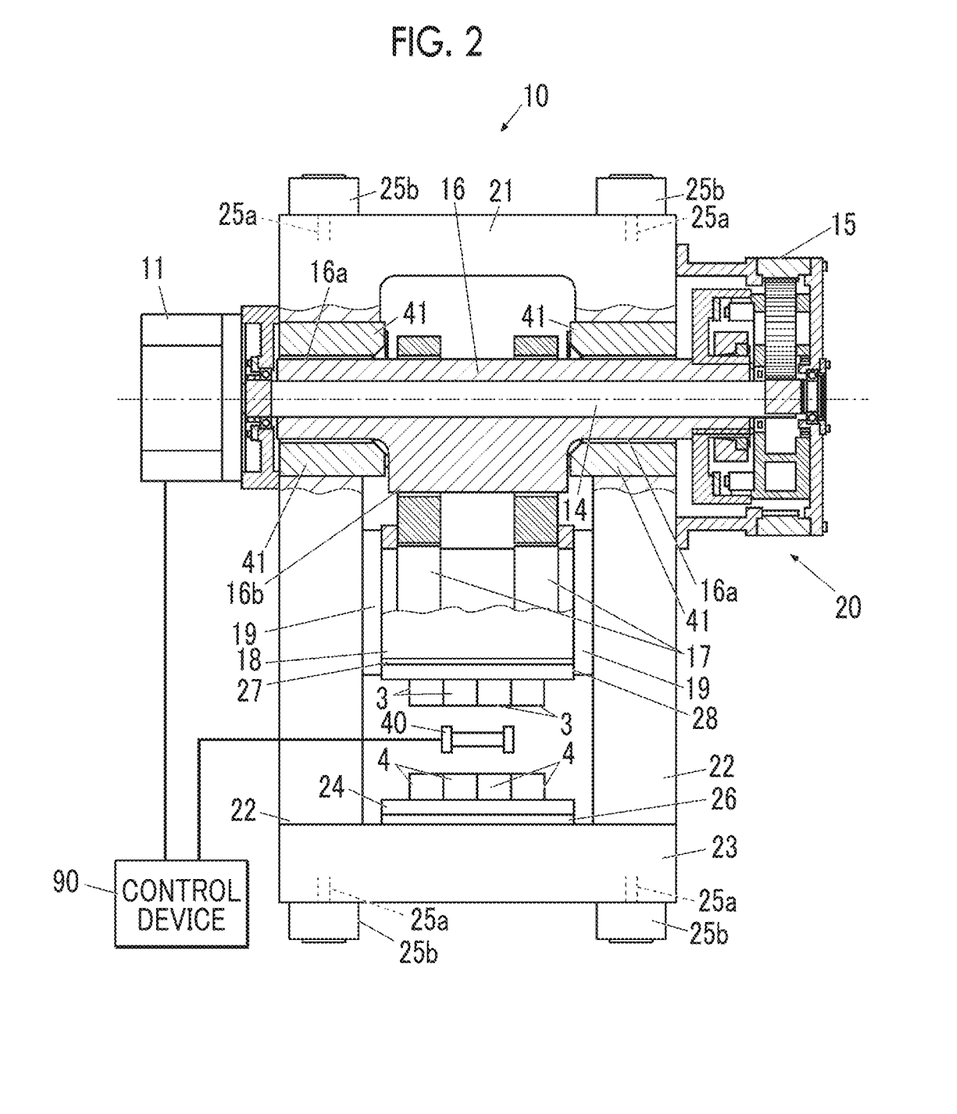
FIG. 2 is a configuration view illustrating a forging press device of the press forming system.

FIG. 2 is a configuration view illustrating the forging press device 10.

The forging press device 10 includes a bed 23, a plurality of uprights 22, a crown 21, a bolster 24, a slide 18, dies 3 and 4 that make a pair, a driving mechanism 20, the control device 90, and transfer feeder 40.

The bed 23, the plurality of uprights 22, and the crown 21 constitute a frame unit of the forging press device 10. The bed 23, the plurality of uprights 22, and the crown 21 are fastened to each other by tie rods 25a being passed therethrough and being fastened by the tie-rod nuts 25b. Four guides 19 (some are not illustrated) are provided for each of the two uprights 22 disposed on the left and right. The slide 18 is capable of being lifted and lowered in an upward-downward direction by the four guides 19. In addition, the movement direction of the slide 18 may not be the upward-downward direction.

A hard plate 27 is mounted on a lower part the slide 18, and a bolster 28 is mounted on a lower part of the hard plate 27. An upper die 3 that is one of the dies that makes a pair is fixed to a lower surface of the bolster 28. In addition, the forging press device 10 includes a plurality of pairs of dies, and a plurality of the upper dies 3 are disposed side by side in a line in a leftward-rightward direction (direction of an eccentric shaft 16) of FIG. 2. For example, although four upper dies are disposed side by side in a line from the left side to the right side in FIG. 2, the number of upper dies may be increased and decreased.

The bolster 24 is fixed to the bed 23 via a hard plate 26. The bolster 24 is a component to which a lower die 4, which is the other of the dies that make a pair, is fixed. In addition, a plurality of the lower dies 4 are disposed side by side in a line in the leftward-rightward direction (direction of the eccentric shaft 16) of FIG. 2 on the bolster 24. For example, although four lower dies are disposed side by side in a line from the left side to the right side in FIG. 2, the number of lower dies may be increased and decreased. Each upper die 3 and each lower die 4 are disposed so as to face each other individually, and approach each other when the slide 18 is lowered. In a case where the forming material W is charged between the upper dies 3 and the lower dies 4 that face each other, the forming material W is pressurized in a die space between the upper dies 3 and the lower dies 4 as the slide 18 is lowered, and the forming material W is forged.

The forging press device 10 includes a servomotor 11, a power transmission shaft 14, a speed reducer 15, the eccentric shaft 16, and a connecting rod 17 as components for lifting or lowering the slide 18, and these constitute the driving mechanism 20.

The servo motor 11 is fixed to a side surface of the frame unit, such as the crown 21 or the uprights 22. The servo motor 11 is capable of performing the control of arbitrarily changing rotating speed during one rotation and the control of performing a stop at an arbitrary rotational angle. Therefore, it is possible that the movement speed of upward and downward lifting and lowering operation of the slide 18 is changed during one stroke or stopped at an arbitrary position.

The servo motor 11 is disposed on the side of one end part of the power transmission shaft 14 in an axial direction thereof. An output shaft of the servo motor 11 is directly connected to the one end part of the power transmission shaft 14.

The speed reducer 15 is disposed in the vicinity of the other end part of the power transmission shaft 14 (that is, in the vicinity of an end part opposite to the servo motor 11) in the axial direction. The servo motor 11 and the speed reducer 15 are disposed coaxially with the eccentric shaft 16.

By virtue of such arrangement, the servo motor 11 and the speed reducer 15 can be disposed in a decentralized manner on both sides of the eccentric shaft 16 in the axial direction. Accordingly, excellent weight balance of the forging press device 10 can be achieved.

In the eccentric shaft 16, a main shaft part 16a is rotatably supported by the frame unit, such as the crown 21 or the uprights 22 via a feeding rod 41.

The eccentric shaft 16 has a hollow part passing therethrough along a rotation center axis. The power transmission shaft 14 is disposed rotatably and coaxially relative to the eccentric shaft 16 in the hollow part. The power transmission shaft 14 transmits the rotational force of the servo motor 11 to the speed reducer 15. The speed reducer 15 decelerates the rotary motion of the power transmission shaft 14 and transmits the decelerated rotary motion to the eccentric shaft 16.

The eccentric shaft 16 has an eccentric part 16b that is eccentric with respect to the main shaft part 16a, and the eccentric part 16b is connected to the connecting rod 17. The connecting rod 17 couples the eccentric shaft 16 and the slide 18 to each other, and converts the rotary motion of the eccentric shaft 16 into a linear motion to transmit the converted linear motion to the slide 18.

As described above, the rotational force of the eccentric shaft 16 is applied via the speed reducer 15 from the servo motor 11. Since the eccentric shaft 16 is configured to make one rotation in one cycle of the forging press device 10, the slide 18 performs the lifting and lowering operation in the upward-downward direction at a low speed with respect to the rotating speed of the servo motor 11.

In addition, the driving mechanism 20, the bolsters 24 and 28, the hard plates 26 and 27, the upper dies 3, and the lower dies 4 constitute the press working unit that performs press forming on the forming material.

The transfer feeder 40 serving as a material supply device, which supplies the forming material W to the press working unit, is provided in the vicinity of the upper dies 3 and the lower dies 4. When the upper dies 3 and the lower dies 4 are separated from each other, this transfer feeder 40 supplies a new forming material W to a lower die 4 and an upper die 3 on the most upstream side, or sequentially conveys a workpiece to the plurality of lower dies 4 and upper dies 3 that are aligned in a line.

The transfer feeder 40 includes two feed rods 41 and 41 that are disposed in parallel, and each of the feed rods 41 and 41 is provided with a plurality of grip claws 42.

The respective feed rods 41 and 41 are disposed parallel to an alignment direction of the plurality of lower dies 4 on both sides of the plurality of lower dies 4 that are disposed in a line.

The respective grip claws 42 extend from the respective the feed rods 41 and 41 so as to face each other. Additionally, the intervals of the alignment direction of the respective grip claws 42 coincide with the intervals of the plurality of lower dies 4. Additionally, each of the feed rods 41 and 41 includes one more grip claws 42 than the lower dies 4 (the lower dies 4 are four and the grip claws 42 is five).

Figure 3:
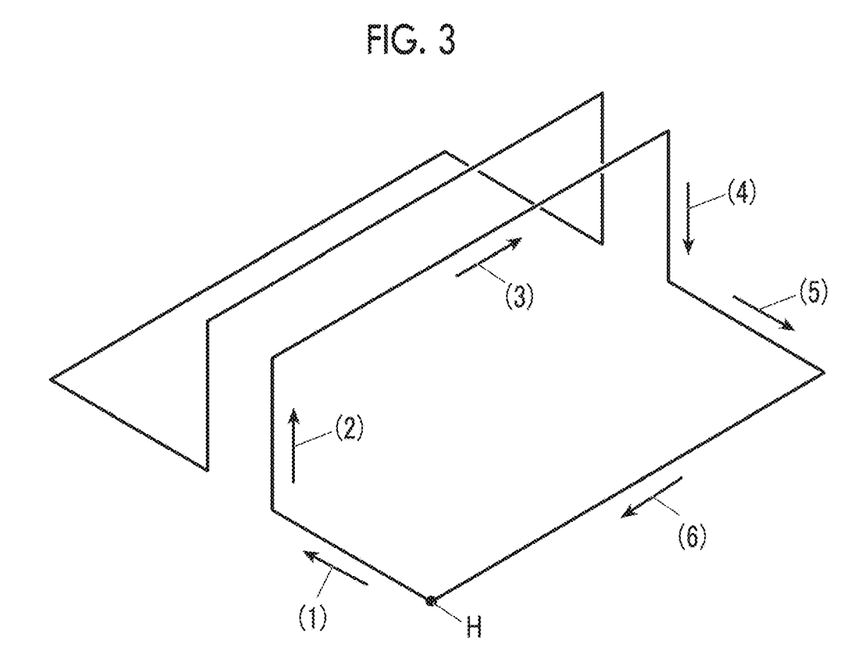
FIG. 3 is an operation explanatory view illustrating a movement track of feed rods and grip claws of a transfer feeder.

As illustrated in FIG. 3, the transfer feeder 40 actuates the two feed rods 41 and 41 in order of (1) Clamping→(2) Lifting→(3) Advancing→(4) Lowering→(5) Unclamping→(6) Return, is synchronized with the press operation of the press working unit, and progressively feeds the forming material W to the four lower dies 4 of the press working unit. In addition, reference sign H is (1) a starting point of a clamping operation and is (6) a waiting position (home position) that becomes a reaching point of a return operation.

Control Device

The control device 90 is an information processing device, such as a microcomputer, which performs the operation control of the press forming system 100 in accordance with a program.

The control device 90 executes the operation control regarding the transfer feeder 40 and the servo motor 11 of the press working unit in accordance with the presence or absence of detection of the suppliable state of the forming material W from the loading device 6 to transfer feeder 40 by the aforementioned detection device 7.

Operation Control of Press Forming System

The operation control of the press forming system 100 to be executed by the control device 90 will be described.

The control device 90 executes different kinds of operation control on the servomotor 11 and the transfer feeder 40 in cases where the suppliable state of the forming material W from the loading device 6 to the transfer feeder 40 is detected and not detected by the detection device 7 within a predetermined determination period p1.

The above determination period p1 will be described below.

The detection of the suppliable state of the forming material W within the determination period p1 by the detection device 7 means that the forming material W is supplied from the loading device 6 without any delay.

Additionally, non-detection of the suppliable state of the forming material W within the determination period p1 by the detection device 7 means the delay of supply of the forming material W from the loading device 6.

Therefore, the control device 90 carries out an operation control in which the servo motor 11 and the transfer feeder 40 performs a standard operation at the time of the detection of the suppliable state.

Additionally, the control device 90 carries out an operation control in which the servo motor 11 and the transfer feeder 40 is temporarily brought into a stop state or a waiting state at the time of the non-detection of the suppliable state.

Figure 4:
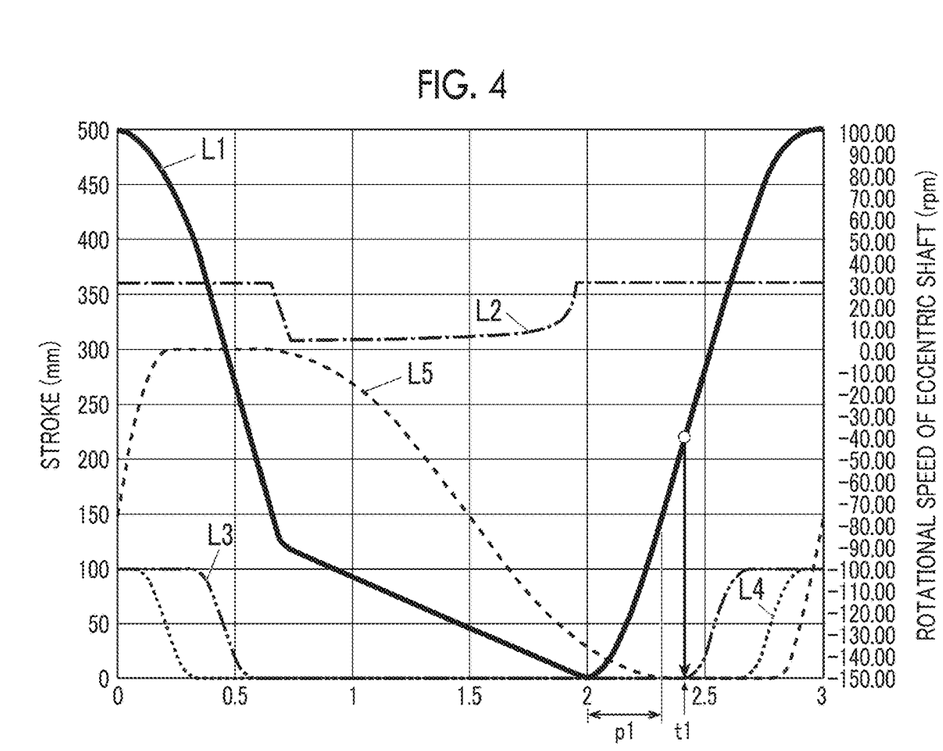
FIG. 4 is an operation diagram of a slide, a transfer feeder, and an eccentric shaft in a case where a forming material suppliable state is detected within a determination period.

FIG. 4 is a diagram illustrating a relationship between the stroke of the slide 18, the operation variations of the transfer feeder 40 in respective directions, and the rotational speed of the eccentric shaft 16 in a case where the suppliable state of the forming material W has been detected within the determination period p1.

Figure 5:
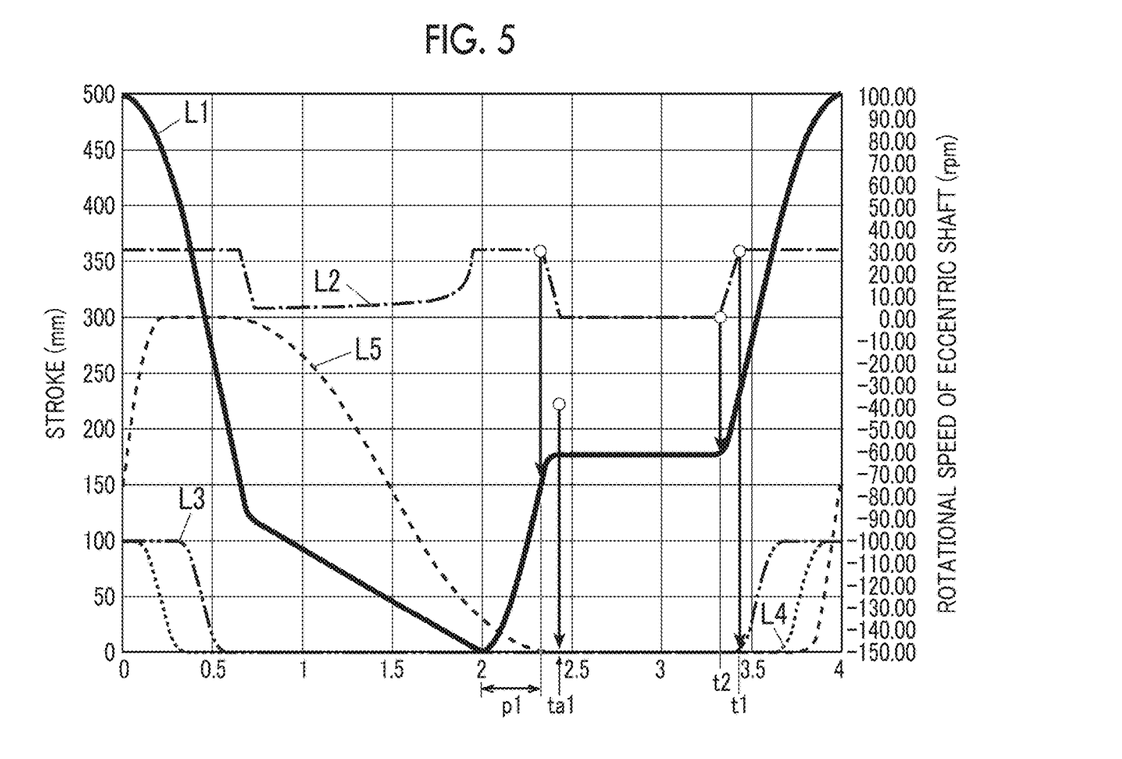
FIG. 5 is an operation diagram of the slide, the transfer feeder, and the eccentric shaft in a case where the forming material suppliable state is not detected within the determination period.

FIG. 5 is a diagram illustrating a relationship between the stroke of the slide 18, the operation variations of the transfer feeder 40 in the respective directions, and the rotational speed of the eccentric shaft 16 in a case where the suppliable state of the forming material W is not detected within the determination period p1.

Thick lines L1 in FIGS. 4 and 5 represent the strokes (the heights of the upper dies 3) of the slide 18.

One-dot chain lines L2 represent the rotational speeds (unit is rpm) of the eccentric shaft 16.

Two-dot chain lines L3 represent the operation variations in the transfer feeder 40 in a clamping/unclamping direction of FIG. 3.

Dotted lines L4 represent operation variations in a lifting/lowering direction.

Dashed lines L5 represent operation variations in an advancing/returning direction.

All the operations illustrated in these operation diagrams are executed by the control of the servomotor 11 and the transfer feeder 40 by the control device 90.

As illustrated by the thick line L1 of FIG. 4, in the standard operation, the slide 18 performs a reciprocal movement in the upward-downward direction in an operation pattern in which the slide 18 passes through a bottom dead center serving as an advance position where press forming is performed from a top dead center that is a withdrawal position, and returns to the top dead center, with rotational driving equivalent to one rotation of the eccentric shaft 16 by the servo motor 11 as one stroke. Here, although a case where the stroke of the slide 18 is 500 [mm] is exemplified, this is merely an example and the invention is not limited to this length.

As illustrated by the one-dot chain line L2, the eccentric shaft 16, which transmits a moving force to the slide 18, rotates at a specified normal speed from the top dead center of the slide 18 halfway toward the bottom dead center thereof. Moreover, the eccentric shaft 16 is decelerated at the height of 125 [mm] where the slide 18 approaches the bottom dead center, and is accelerated to the normal speed near the bottom dead center, and the slide 18 is lifted to the top dead center as it is. The slide 18 repeatedly executes this operation.

The transfer feeder 40 stands by at the aforementioned waiting position H, and starts a supply operation at a synchronous timing t1 before the slide 18 returns from the bottom dead center to the top dead center.

At the synchronous timing t1, as illustrated by the two-dot chain line L3, a clamping movement of the respective feed rods 41 and 41 is performed.

Next, a lifting movement is performed as illustrated by the dotted line L4.

Next, an advancing movement is performed as illustrated by the dashed line L5.

Next, a lowering movement is performed as illustrated by the dotted line L4.

Next, an unclamping movement is performed as illustrated by the two-dot chain line L3.

Next, a returning movement is performed as illustrated by the dashed line L5. Then, when this returning movement ends, the next synchronous timing t1 is reached.

The synchronous timing t1 of the transfer feeder 40 indicates a timing at which the rising slide 18 passes through a synchronous position.

The synchronous position is a suitable position where the grip claws 42 of the transfer feeder 40 or the forming material W held by the grip claws 42 does not interfere with the upper dies 3 that are lifted by the reciprocal movement of the slide 18 in a case where the transfer feeder 40 has started an operation at the timing at which the slide 18 passes through the synchronous position.

In such synchronous timing t1, the slide 18 is at the height of 220 [mm], and the eccentric shaft 16 rotates at the normal speed.

That is, the slide 18 has a timing, at which the above synchronous position is reached at the normal speed, as the synchronous timing t1.

Meanwhile, since the determination period p1 is a period in which it is determined whether or not the servo motor 11 and the transfer feeder 40 are temporarily stopped, it is desirable that the determination period p1 is within a range after the passage of the slide 18 through the bottom dead center and before the above synchronous timing t1.

In the present embodiment, as illustrated in FIG. 5, the start of the determination period p1 is at the time of passing through the bottom dead center of the slide 18, and the end of the determination period p1 is slightly before the synchronous timing t1. Although FIG. 5 is a diagram in a case where the servo motor 11 has stopped, reference sign ta1 represents a synchronous timing in a case where the servo motor 11 is not stopped.

The reason why the end of the determination period p1 is slightly before the synchronous timing t1 is because, when the servo motor 11 is returned to a rotational state from a stopped state, the acceleration can be made to the normal speed at a position corresponding to the aforementioned synchronous timing t1.

In a case where the suppliable state of the forming material W is not detected within the determination period p1 set to the above range, the control device 90 controls the servo motor 11 and the transfer feeder 40 as illustrated in FIG. 5.

Namely, as illustrated by the thick line L1 and the one-dot chain line L2, the servo motor 11 is decelerated and rapidly stopped at the time of the end of the determination period p1, and the slide 18 is stopped at a position (about 180 [mm]) before the synchronous position of the synchronous timing t1.

Then, if the detection of a set time specified in advance and the suppliable state of the forming material W is continued and the detection of the suppliable state of the forming material W is performed during the set time (reference sign t2 represents a detection time), the rotational driving of the servo motor 11 is rotated, and reciprocal operation of the slide 18 is resumed.

Then, if the slide 18 reaches the position corresponding to the aforementioned synchronous timing t1 at the normal speed, the transfer feeder 40 sequentially executes the same operations as those in the case of FIG. 4 described above.

Description of Operation of Press Forming System

Figure 6:
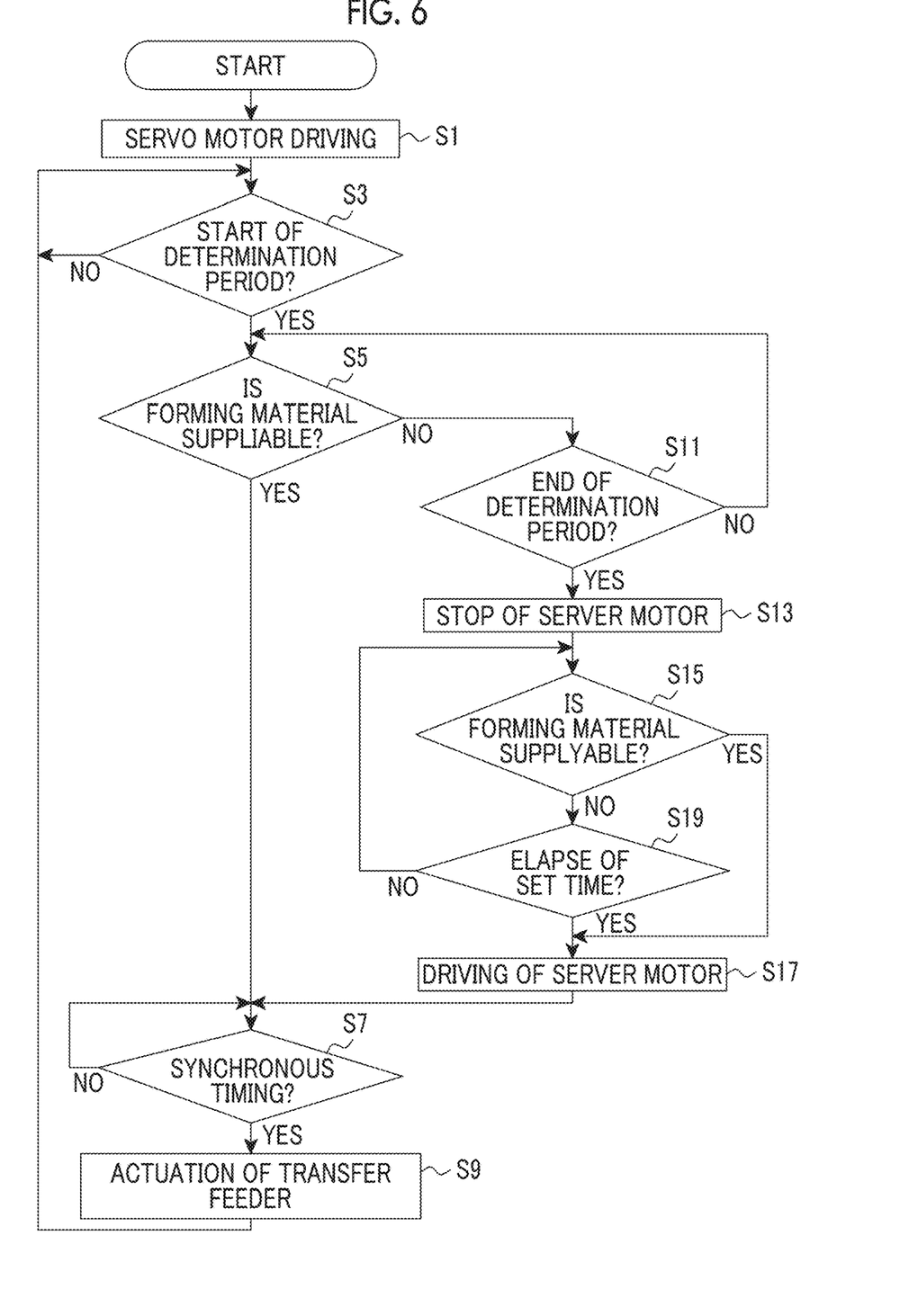
FIG. 6 is a flowchart illustrating an operation control of the press forming system by a control device.

The operation control of the press forming system 100 by the above control device 90 will be described with reference to a flowchart of FIG. 6.

First, during the driving of the servomotor 11 (Step S1), the control device 90 determines reaching at the start timing of the aforementioned determination period p1 from the shaft angle of a motor output shaft by an encoder provided together with the servo motor 11 (Step S3).

Then, in a case where the start timing of the determination period p1 is not reached, the determination concerned is repeatedly executed (Step S3: NO).

Additionally, in a case where the start timing of the determination period p1 has been reached (Step S3: YES), it is determined whether or not the suppliable state of the forming material W from the loading device 6 is detected by and the detection device 7 (Step S5).

Then, in a case where the suppliable state of the forming material W has been detected (Step S5: YES), a loading command of the forming material W is input to the loading device 6, and the reaching at the synchronous timing t1 is determined from the encoder of a servo motor 11 (Step S7).

Then, in a case where the synchronous timing t1 is not reached, the determination concerned is repeatedly executed (Step S7: NO).

Additionally, in a case where the synchronous timing t1 has been reached (Step S7: YES), as illustrated in FIG. 4, the transfer feeder 40 is actuated and the operations of clamping→lifting→advancing→lowering→unclamping→returning are sequentially executed (Step S9).

Accordingly, a new forming material W is supplied to a lower die 4 on the most upstream side, and the forming material W is conveyed from the upstream side to the other lower dies 4.

Then, the control device 90 returns the processing to Step S3, and determines the reaching at the start timing of the determination period p1 again.

On the other hand, in Step S5, in a case where the suppliable state of the forming material W from the loading device 6 is not detected by the detection device 7 (Step S5: NO), reaching at an end timing of the determination period p1 is determined (Step S11).

Then, in a case where the end timing of the determination period p1 is not reached (Step S11: NO), the processing is returned to Step S5 where it is determined whether or not the suppliable state of the forming material W has been detected.

Additionally, in a case where the end timing of the determination period p1 has been reached without the suppliable state of the forming material W being detected (Step S11: YES), the control device 90 stops the driving of the servo motor 11 as illustrated in FIG. 5 (Step S13).

Then, it is determined again whether or not the suppliable state of the forming material W has been detected (Step S15).

Then, in a case where the suppliable state of the forming material W from the loading device 6 is not detected by the detection device 7 (Step S15: NO), it is determined whether or not the set time has elapsed from the stop of the servo motor 11 (Step S19).

In a case where the set time has not elapsed (Step S19: NO), it is determined whether or not the suppliable state of the forming material W has been detected again (Step S15).

Accordingly, before the set time elapses, in a case where the suppliable state of the forming material W from the loading device 6 has been detected (Step S15: YES), the driving of the servo motor 11 is resumed (Step S17), and the processing is advanced to Step S7.

That is, after waiting for the reaching at the synchronous timing t1 (Step S7), the transfer feeder 40 is actuated (Step S9).

On the other hand, in a case where the set time has elapsed (Step S19: YES) while the suppliable state of the forming material W from the loading device 6 has not been detected, the driving of the servomotor 11 (Step S17) is resumed, the reaching at the synchronous timing t1 (Step S7) is waited for, and then the transfer feeder 40 is actuated (Step S9).

That is, considering that production has ended without occurrence of an abnormality, a forging press work is executed as it is without waiting for supply of a new forming material W.

In addition, in Step S19, although the operation control that the forging press work is executed without waiting for the supply of the new forming material W has been exemplified as described above, the forging press work may be stopped.

The fact that the determination period p1+the set time have elapsed without detecting the suppliable state of the forming material W from the loading device 6 means that there is a possibility that trouble has occurred In the loading device 6, or the heating furnace 1 and the loading conveyor 2 upstream thereof. Therefore, in a case where the set time has elapsed in Step S19, an error notification may be performed, and control for stopping the work may be performed.

Technical Effects of One Embodiment

In the above press forming system 100, the control device 90 performs the control in which the slide 18 is stopped before reaching the top dead center from the bottom dead center in a case where the suppliable state of the forming material W is not detected within the determination period p1 by the detection device 7.

Accordingly, since the movement operation of the slide 18 is resumed from a position before the top dead center, the delay of the transfer feeder 40 can be suppressed and can be easily synchronized with the slide 18.

For this reason, it is easy to avoid blank striking in the forging press device 10, and it is possible to improved productivity and to supply the forming material W upstream of the forging press device 10 without any delay.

Additionally, since the control device 90 performs the control for resuming the operation of the slide 18 if the suppliable state of the forming material W is detected by the detection device 7 after the slide 18 is stopped.

For this reason, the operation of the slide 18 can be resumed at an appropriate timing, and it is possible to suppress occurrence of the blank striking and realize an appropriate forging press.

Moreover, in the press forming system 100, the determination period p1 is set to a range before the synchronous timing t1 after the slide 18 passes through the bottom dead center.

For this reason, the control device 90 can stop the slide 18 before the synchronous timing t1 in a case where the suppliable state of the forming material W is not detected within the determination period p1 by the detection device 7.

Accordingly, it is possible to suppress redundant stop time of the slide 18 and to further improve productivity.

Additionally, since the slide 18 reaches the synchronous timing after the operation of the slide 18 is resumed, it is easy to secure a period in which the slide 18 is accelerated to a normal speed, and it is possible to more appropriately synchronize the transfer feeder 40 also from this point of view.

Additionally, as in the other operation control (1) to be described below, reversal movement of the slide 18 is made unnecessary. Thus, it is possible to reduce the energy loss of the servo motor 11.

Additionally, in the forging press device 10 of the press forming system 100, the servo motor 11 is used as a drive source for the movement operation of the slide 18. Thus, operations, such the speed control, temporary stop, and driving resumption of the servomotor, can be more appropriately performed, and it is possible to more effectively realize an improvement is productivity resulting from by the synchronization or suitable speed of the transfer feeder 40.

Other Operation Control (1) of Press Forming System

Although a case where the determination period p1 is within the range after the passage of the slide 18 through the bottom dead center and before the synchronous timing t1 has been exemplified in the above press forming system 100, the determination period p1 may be may be within a range after the passage of the slide 18 through the bottom dead center and before the reaching of the slide 18 at the top dead center.

Figure 7:
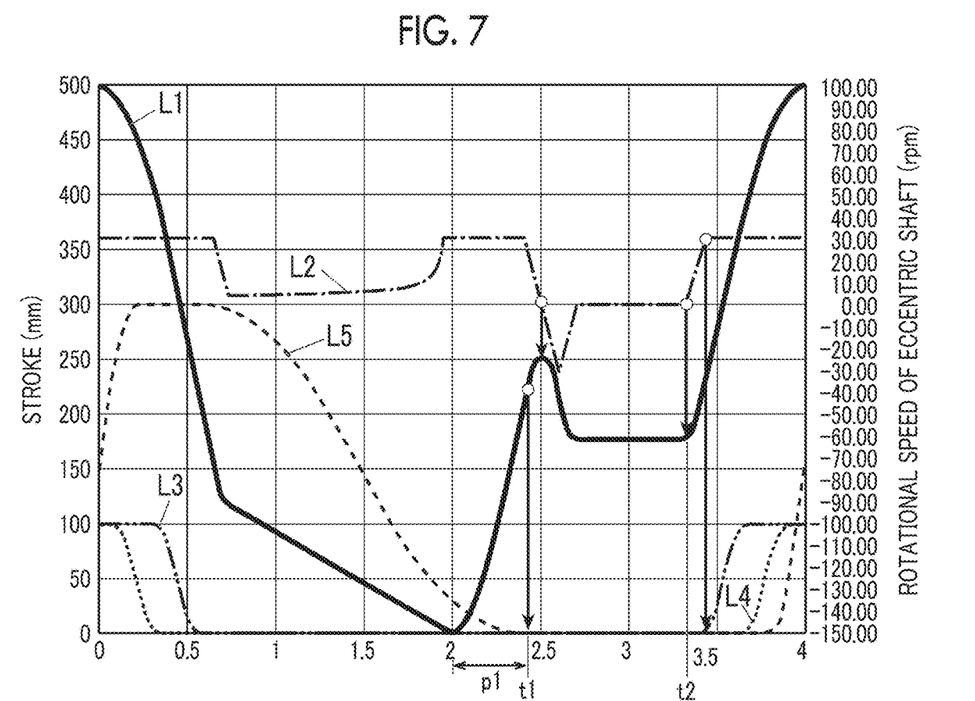
FIG. 7 is an operation diagram of the slide, the transfer feeder, and the eccentric shaft in a case where the forming material suppliable state is not detected within the determination period, in another operation control (1) of the press forming system.

Here, although a case where the determination period p1 is from the passage of the slide 18 of the bottom dead center to the synchronous timing t1 is illustrated to FIG. 7, the end of the determination period p1 may be near the reaching at the top dead center.

As illustrated in FIG. 7, in a case where the suppliable state of the forming material W from the loading device 6 is not detected within the above determination period p1 by the detection device 7, as illustrated by the one-dot chain line L2, the servomotor 11 starts deceleration toward speed 0 together with the end of the determination period p1.

Then, the servo motor 11 performs a reverse rotation is from the stop thereof as it is, and as illustrated by the thick line L1, lowers the slide 18 to a position (about 180 [mm]) closer to the bottom dead center than the synchronous position at the synchronous timing t1, and stops.

Then, if the detection of the set time specified in advance and the suppliable state of the forming material W is continued and the detection of the suppliable state of the forming material W is performed during the set time (reference sign t2 represents a detection time), the rotational driving of the servo motor 11 is rotated, and reciprocal operation of the slide 18 is resumed.

Then, if the slide 18 reaches the position corresponding to the aforementioned synchronous timing t1 at the normal speed, the transfer feeder 40 sequentially executes the same operations as those in the case of FIG. 4 described above.

In this way, in a case where the determination period p1 is within the range after the passage of the slide 18 through the bottom dead center and before the reaching of the slide 18 at the top dead center, the control device 90 performs the control for reversing the servomotor 11 to reversely moving the position of the slide 18 to the position closer to the bottom dead center than the position of the slide 18 at the synchronous timing t1.

For this reason, the transfer feeder 40 can be easily synchronized with the slide 18 without being delayed.

Therefore, even in this case, it is possible to improve the productivity of the system and to perform the supply of the forming material W upstream of the forging press device 10 without any delay.

Other Operation Control (2) of Press Forming System

In the above other operation control (1), a case where the determination period p1 is set to be within the range after the passage of the slide 18 through the bottom dead center and before the reaching of the slide 18 at the top dead center, and the slide 18 is reversely moved the position closer to the bottom dead center than the synchronous position has been exemplified in the inversion of the servo motor 11.

However, in the above determination period p1, the reversal movement of the slide 18 may not be performed.

Figure 8:
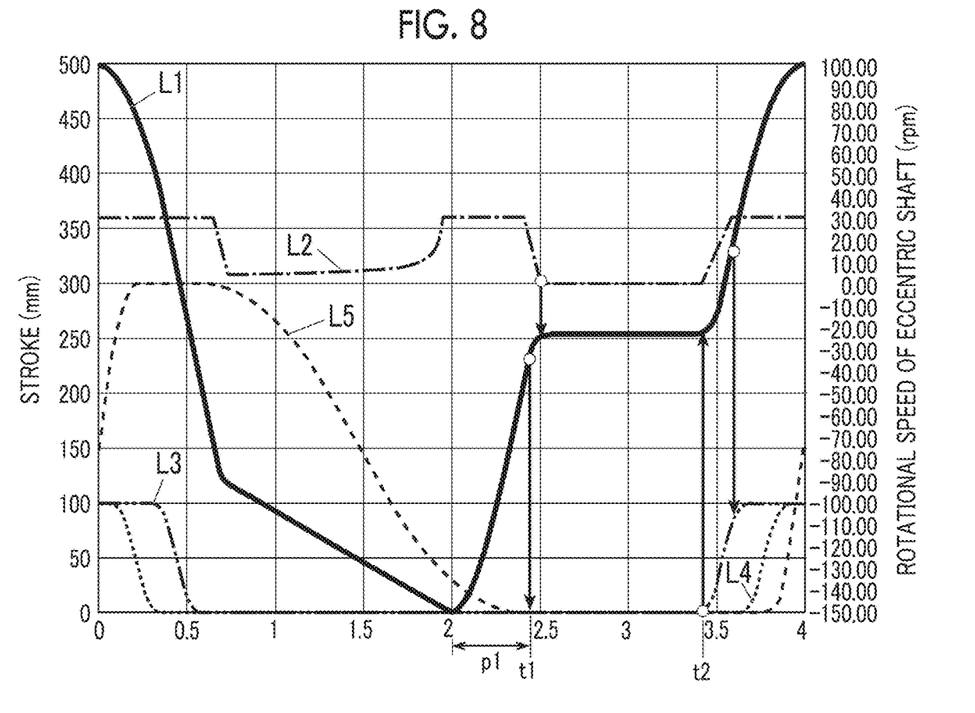
FIG. 8 is an operation diagram of the slide, the transfer feeder, and the eccentric shaft in a case where the forming material suppliable state is not detected within the determination period, in still another operation control (2) of the press forming system.

As illustrated in FIG. 8, in a case where the suppliable state of the forming material W from the loading device 6 is not detected within the above determination period p1 by the detection device 7, as illustrated by the one-dot chain line L2, the servo motor 11 decelerates together with the end of the determination period p1 and stops. That is, the slide 18 stops at the position (about 260 [mm]) closer to the top dead center than the synchronous position of the synchronous timing t1.

Then, if the detection of the set time specified in advance and the supplied state of the forming material W is continued and the detection of the suppliable state of the forming material W is performed during the set time (reference sign t2 represents the detection time), the rotational driving of the servo motor 11 is rotated, and the reciprocal operation of the slide 18 is resumed.

In this case, since the slide 18 already passes through the position corresponding to the synchronous timing t1, the transfer feeder 40 is driven simultaneously with the resumption of movement of the slide 18, and sequentially executes the same operations as those in the case where of FIG. 4 described above.

In this way, the control device 90 performs the resumption of the reciprocal operation of the slide 18 and the control for driving the transfer feeder 40 without reversing the servo motor 11 in a case where the determination period p1 is within the range after the passage of the slide 18 through the bottom dead center and before the reaching of the slide 18 at the top dead center.

Even in this case, the delay of the transfer feeder 40 can be reduced compared to a case where the operation of the transfer feeder 40 is started after the slide 18 reaches the top dead center. Thus, it is possible to improve the productivity of the system and to perform the supply of the forming material W upstream of the forging press device 10 without any delay.

Another Embodiment

Figure 9:
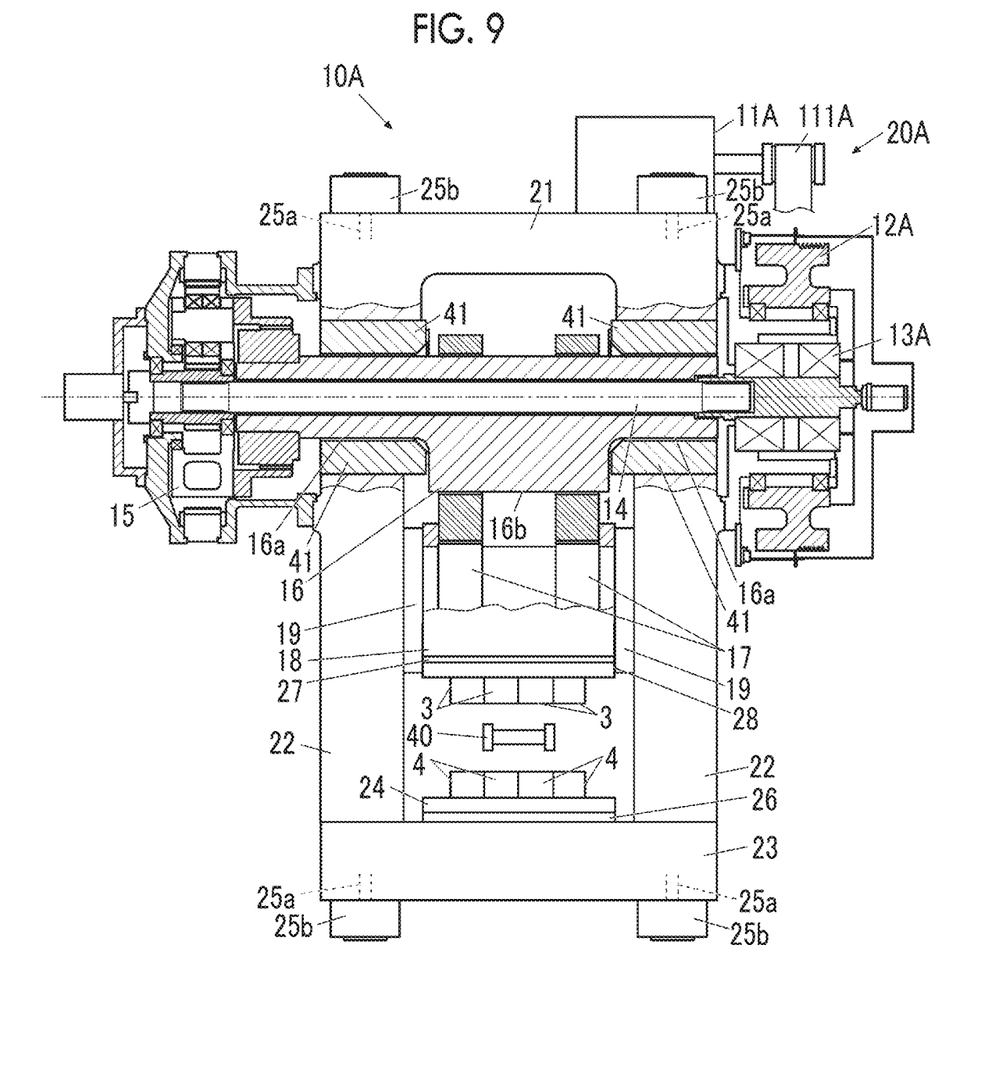
FIG. 9 is a configuration view illustrating a forging press device of a press forming system related to another embodiment.

A press forming system of another embodiment of the invention has a configuration including a forging press device 10A instead of the aforementioned forging press device 10. Since this press forming system is the same as the aforementioned press forming system 100 regarding configurations other than the forging press device 10A, the forging press device 10A will mainly be described.

FIG. 9 is a configuration view illustrating the forging press device 10A.

The forging press device 10A is mainly different from the aforementioned forging press device 10 in that the servo motor 11 of the driving mechanism 20 of the forging press device 10 is replaced with a motor 11A allowing speed control like an inverter motor. In the following description, differences of the forging press device 10A from the aforementioned forging press device 10 will mainly be described, the same components as those of the forging press device 10 will be designated by the same reference signs, and duplicate description will be omitted.

In the forging press device 10A, a motor 11A, a flywheel 12A, a clutch brake 13A serving as a clutch, the power transmission shaft 14, the speed reducer 15, the eccentric shaft 16, and the connecting rod 17 constitute a driving mechanism 20A.

The power of the motor 11A is transmitted to the flywheel 12A via, for example, a belt 111A, and rotates the flywheel 12A.

If the clutch brake 13A can connect and disconnect the flywheel 12A and the power transmission shaft 14, and if these are connected to each other, the rotary motion of the flywheel 12A is transmitted to the power transmission shaft 14. Moreover, the clutch brake 13A can connect and disconnect the power transmission shaft 14 and a fixed portion. The fixed portion is, for example, the frame unit, such as the uprights 22, or a member fixed to the frame unit.

In the case of the above forging press device 10A, the above driving mechanism 20A, the bolsters 24 and 28, the hard plates 26 and 27, the upper dies 3, and the lower dies 4 constitute the press working unit that performs press forming on the forming material.

Even in the case of the press forming system in which the forging press device 10 is replaced with the above forging press device 10A, it is possible to perform the press working operation control illustrated in FIG. 4, 5, or 8.

For example, the deceleration at the time of the lowering of the slide 18 can be realized by braking performed by the clutch brake 13A or deceleration control of the motor 11A.

Additionally, the control for temporarily stopping the slide 18 can be realized by disconnection of the power by the clutch brake 13A.

Therefore, even in the case of the press forming system 100 using the forging press device 10A, it is possible to improve productivity and to supply the forming material W upstream of the forging press device 10A without any delay.

Others

The respective embodiments of the invention have been described above. However, the invention is not limited to the above respective embodiments. The details illustrated in the respective embodiments can be appropriately changed without departing from the scope of the invention.

It should be understood that the invention is not limited to the above-described embodiment, but may be modified into various forms on the basis of the spirit of the invention. Additionally, the modifications are included in the scope of the invention.

What is claimed is:
1. A press forming system comprising:
a press working unit configured to perform press forming on a forming material;
a material supply device configured to supply the forming material to the press working unit;
a detection device configured to detect the forming material supplied from the material supply device; and a control device configured to control the press working unit and the material supply device, wherein the press working unit comprises a slide that is moveable in accordance with an operation pattern in which the slide passes through an advance position where press forming is formed from a withdrawal position, and returns to the withdrawal position, wherein the material supply device is configured to start a supply operation at a synchronous timing while the slide returns from the advance position to the withdrawal position, wherein the control device configured to perform a control for stopping the slide before the slide reaches the withdrawal position from the advance position in a case where the forming material is not detected within a predetermined determination period by the detection device, wherein the synchronous timing is a timing at which the slide moving from the advance position to the withdrawal position passes through a synchronous position, and wherein the synchronous position is a position where the material supply device or the forming material held by the material supply device does not interfere with the press working portion due to the movement of the slide in a case where the material supply device starts the supply operation at the timing at which the slide passes through the synchronous position.

2. The press forming system according to claim 1, wherein when the slide is stopped, the control device is configured to perform a control for resuming operation of the slide and then, the forming material is detected by the detection device.

3. The press forming system according to claim 1, wherein the determination period is determined to be within a range after the passage of the slide through the advance position and before the reaching of the slide at the withdrawal position, and wherein the control device is configured to perform a control for returning the slide through a reversal movement to a position of the slide at the synchronous timing or to a position closer to the advance position than the position of the slide after the material supply device and the slide are stopped.

4. The press forming system according to claim 1, wherein the determination period is determined to be within a range after the passage of the slide through the advance position and before the synchronous timing.

5. The press forming system according to claim 1, wherein the press working unit has a servo motor as a drive source for a movement operation of the slide.

6. The press forming system according to claim 1, wherein the press working unit comprises a flywheel, a motor that rotates the flywheel, and a clutch that switches connection and disconnection of a rotational force of the flywheel to and from the slide side.

* * * * *